Nov. 8, 1949     C. W. GREENE     2,487,237
POWER-OPERATED FLEXIBLE MACHINE GUN MOUNT
Filed Feb. 14, 1945     6 Sheets-Sheet 1

Inventor
Chester W. Greene
By his Attorney

Nov. 8, 1949    C. W. GREENE    2,487,237
POWER-OPERATED FLEXIBLE MACHINE GUN MOUNT
Filed Feb. 14, 1945    6 Sheets-Sheet 2

Inventor
Chester W. Greene
By His Attorney

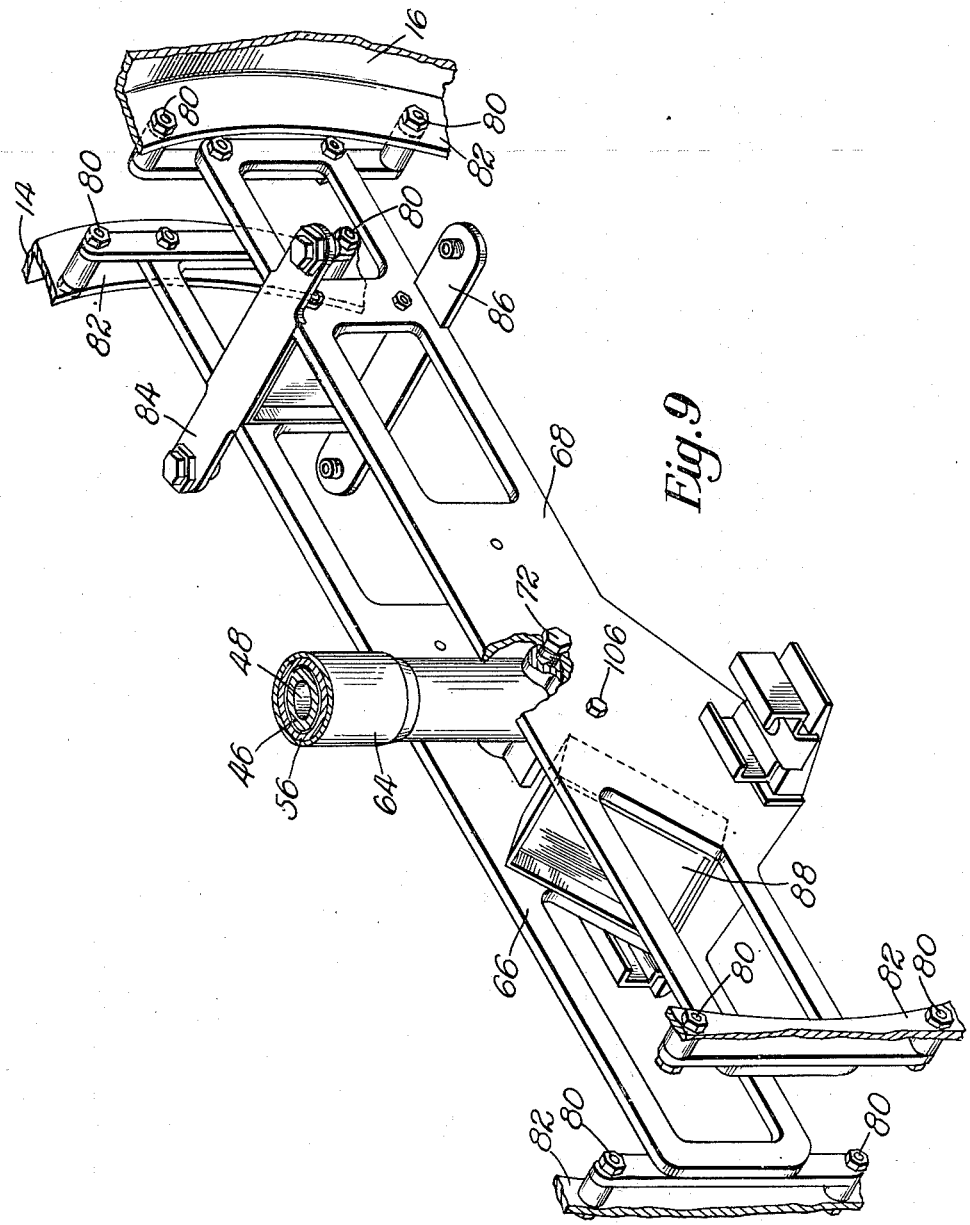

Patented Nov. 8, 1949

2,487,237

UNITED STATES PATENT OFFICE 2,487,237

POWER-OPERATED FLEXIBLE MACHINE GUN MOUNT

Chester W. Greene, Lynn, Mass., assignor to United Shoe Machinery Corporation, Flemington, N. J., a corporation of New Jersey Application February 14, 1945, Serial No. 577,769

8 Claims. (Cl. 89—37.5)

This invention relates to a power operated gun mount readily adaptable for use in an airplane, and more particularly to a ball turret gun mount for one or more machine guns in which power means are provided for moving the gun or guns in elevation and/or azimuth.

In the use of such a gun mount it is obviously of the utmost importance that a minimum of discomfort, restriction and mechanical or frictional resistance be present for the operator to endure and overcome in training his gun or guns upon a target. In modern combat service, a considerable number of rounds of ammunition may be used in a single engagement thus necessitating the use of large ammunition containers which cannot move with the mount but must be placed in fixed positions near it and have provision for feeding the cartridge belts freely and easily to the guns. Compactness of the mount is desirable as it facilitates the ease with which the operator may move about in his necessarily restricted space and it aids in avoiding sluggishness of motion due to the operator being cramped in such space for extended periods of time. In order to free the operator from contact with the physical force as well as chilling effect of the air stream a shielding means must be provided which will not interfere with gun training and which will readily permit access to structural features of the mount for the repair or replacement of parts.

It is an object of the present invention to provide a ball turret gun mount of compact design in which one or more conventional ammunition chutes are provided and so arranged as freely to guide cartridge belts into the ball turret from fixed-position ammunition containers despite the necessary distortion of the chutes when subjected to twisting forces during movement of the guns in azimuth and elevation. A further object is to provide a gun mount in which the mechanism for elevating the gun or guns is compactly arranged directly on a main gun support post. Still another object is to provide a protective shell or shielding means for a mount which shell encircles the main gun support post and yet permits convenient access to the mount for repair and replacement of parts.

Accordingly and as herein illustrated, one important feature of the invention is the arrangement of ammunition chutes in such a way that cartridge belts are guided from ammunition containers fixed in positions outside the ball turret or spherical shell constituting the shielding means into the turret without undue distortion of the chutes or interference with gun training. Another feature is the linking of the gun or guns to a fluid pressure operated cylinder slidable upon a main gun supporting post for elevating and/or lowering the gun or guns by means of power. Still another feature is the shielding means or spherical shell, a portion of which moves with the gun or guns in elevation and at least one portion thereof which can be conveniently removed for access to the mount.

These and other important features of the invention including various novel details of construction and combinations of parts will now be more particularly described in the specification and pointed out in the claims.

In the drawings,

Fig. 9 is a perspective view of the adaptors and immediate associated parts for supporting the guns.

The invention is shown as embodied in a ball turret mount installed in the tail end of an airplane fuselage. The mount includes a spherical enclosure or shell, generally indicated as 10, having a central or main ring section 12 which is rotatable on a vertical axis only and two adjacent or main side sections 14 and 16 (Fig. 2) which are rotatable upon a horizontal axis, as will be explained below, and through which sections guns 18 and 20 extend for movement therewith in elevation.

Figure 8:
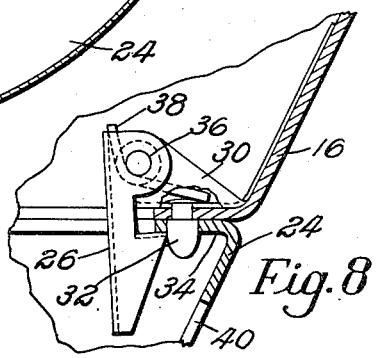
Fig. 8 is an enlarged detail view of the type of latch for the casing as seen in Fig. 2.

The spherical enclosure 10 also includes two end sections 22 and 24 which are removably attached to sections 14 and 16 by latches 26, such as shown in detail in Fig. 8. Each latch 26 comprises a bracket 30 which is riveted to a section 14 or 16 by a rivet 32 having a rounded portion extending through the flange 34 of section 22 or 24. The rounded end portion of each rivet 32 serves as a guide during assembly of the sections to properly locate the end sections in position on the turret sphere. The bracket 30 pivotally supports the latch 26 upon a pin 36, and a spring 38 is placed, as shown, to bias the latch member 26 into locked position over the flange 34. Small openings 40 are provided in sections 22 and 24 whereby convenient access to the latches 26 is to be had. Release of the latches from the flange 34 permits ready removal of either of sections 22 or 24 exposing the interior of the mount for purposes of repair or replacement of parts.

Figure 1:
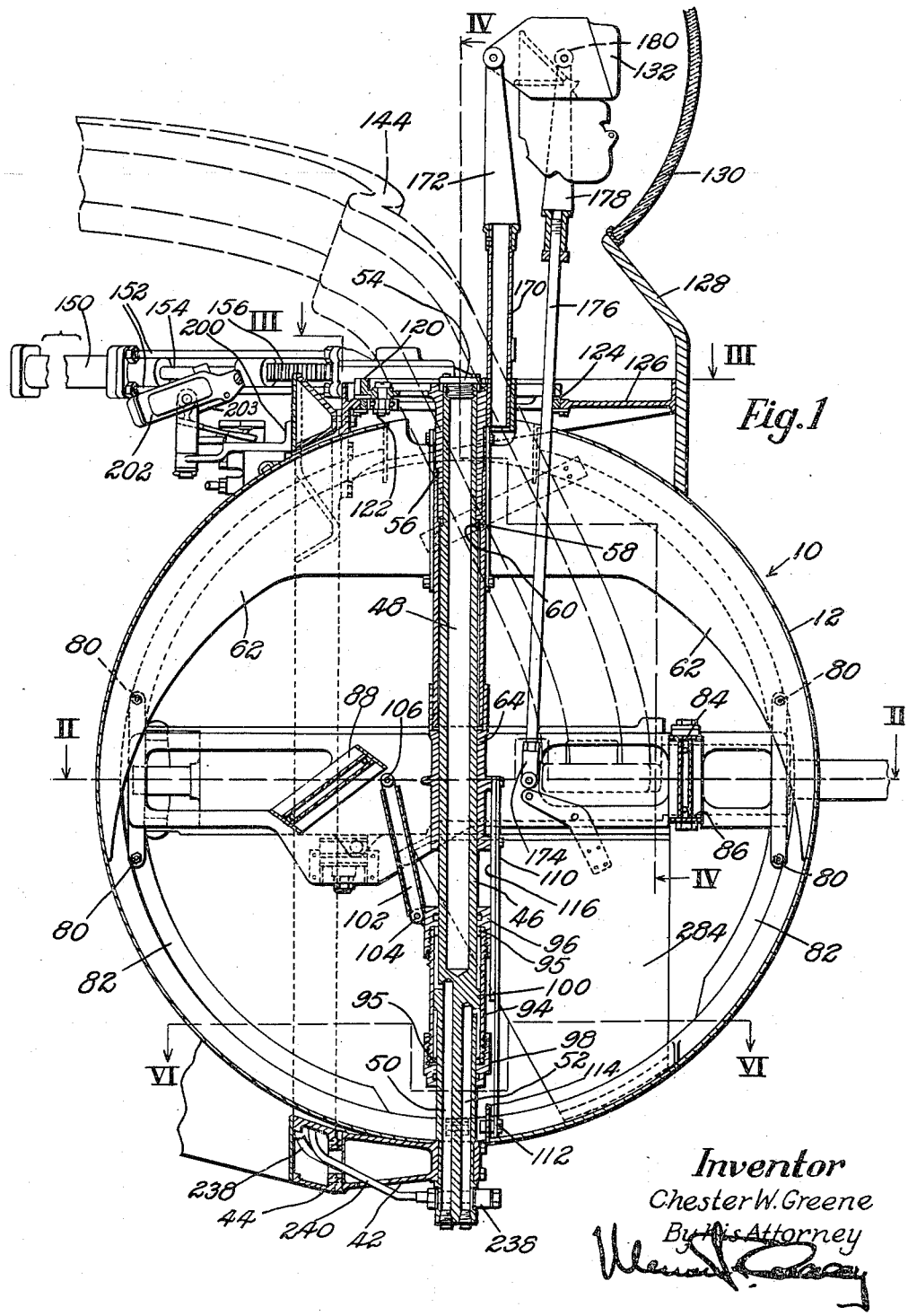
Fig. 1 is a vertical and sectional side view through a gun mount in which the present invention is embodied, the gun mount being illustrated as mounted in the tail of an airplane.

At the bottom of the turret (Fig. 1) a bracket 42 is secured to a circular frame member 44 of the fuselage which surrounds a portion of the sphere and which permits rotation of the sphere parts relative thereto. The bracket 42 serves as a support for a central supporting post or elongated rigid member 46 of the mount which is suitably clamped to the bracket, as shown in Fig. 1. The post 46 is not mounted for rotation but it is hollowed out at 48 for the purpose of removing excess weight. At the bottom of post 46 are two fluid passages 50 and 52 provided for a purpose to be subsequently described. At the top of the post a cap 54 is provided as a closure for the end of the post and also to serve as a retaining member or thrust bearing retaining member for a sleeve 56 rotatably mounted on the post 46. The sleeve 56 is held from downward movement on the post 46 by a suitable bearing 58 resting upon a shoulder 60 of the post 46. The inner and annular section 12 of the sphere 10 is provided with two reinforcing flanges or plates 62 which are bolted to the sleeve 56, as shown in Fig. 1. The sleeve 56 extends downwardly and is firmly joined by means of screw threads or otherwise with trunnion block 64 for rotation therewith upon the post 46. Adaptors 66 and 68 (Fig. 2) are pivoted upon trunnions 70 and 72 of the trunnion block and these adaptors serve to support the guns and the outer sections 14, 16, 22 and 24 of the sphere or shell 10. The guns may be secured to the adaptors in any convenient way which permits bore sighting and adjustment, and the sphere sections are supported on the adaptors by bolts 80 passing through bent-in flanges 82 of sphere sections 14 and 16. The guns 18 and 20 are conveniently tied together by means of links 84 and 86 and the adaptors 66 and 68 are maintained in definite relationship by a bracket 88 fastened to them and extending between them.

Mounted telescopically upon the lower half of post 46 is a fluid pressure cylinder 94 (Fig. 1) having capped ends 96 and 98 suitably packed to prevent leakage and this cylinder constitutes a fluid pressure operated motor. The post 46 is provided with an annular shoulder 100, as shown, which divides the interior of the cylinder 94 into two compartments. The pressure fluid passage 52 communicates with the lower compartment and pressure fluid passage 50 communicates with the upper compartment, as shown. A link or power translating means 102 is pivoted at 104 to the upper cap 96 of the cylinder 94 and also is bifurcated at its upper end and pivoted on a shaft 106 supported through and between the two adaptors 66 and 68. A plate 110 is bolted, as shown in Fig. 1, to the trunnion block 64 and extends downwardly and is bolted at 112 to a flange 114 which forms a part of the inner spherical section 12. Also fastened to the trunnion block 64 is a flat key member 116 which extends downwardly to engage a flattened side of the pressure cylinder cap 98. With this construction the cylinder 94 may slide up and down on the post 46 and rotation of the guns in azimuth also rotates the cylinder 94 because of the key member 116, thus preventing an undue strain on the link 102.

Figure 5:
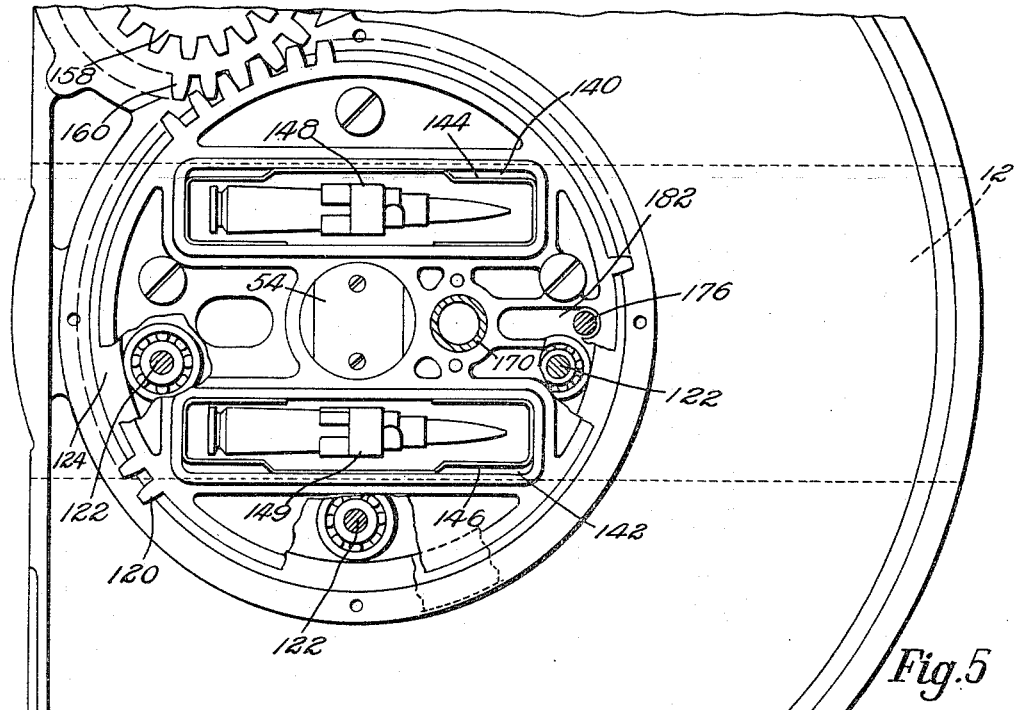
Fig. 5 is an enlarged view of a portion of Fig. 3 with some parts broken away.

Sleeve 56 at the top of the post 46 is integral with the gear segment 120 (Figs. 1, 3 and 5), which gear segment carries six short pinions 122 with bearings thereon to run upon the inner face of a ring member 124 supported by the bracket 126 attached to the airplane fuselage 128. The ring member 124 has an aperture to accommodate the post 46 and other elements extending through the wall of the shell 10.

Above the spherical turret shell 10 and attached to the fuselage 128 is located a transparent window 130 behind which the sight 132 is placed. The gunsight may be of any suitable type but is herein shown in outline as a standard reflex sight having a casing and an aiming device utilizing a cross-hair image.

Figures 3, 4:
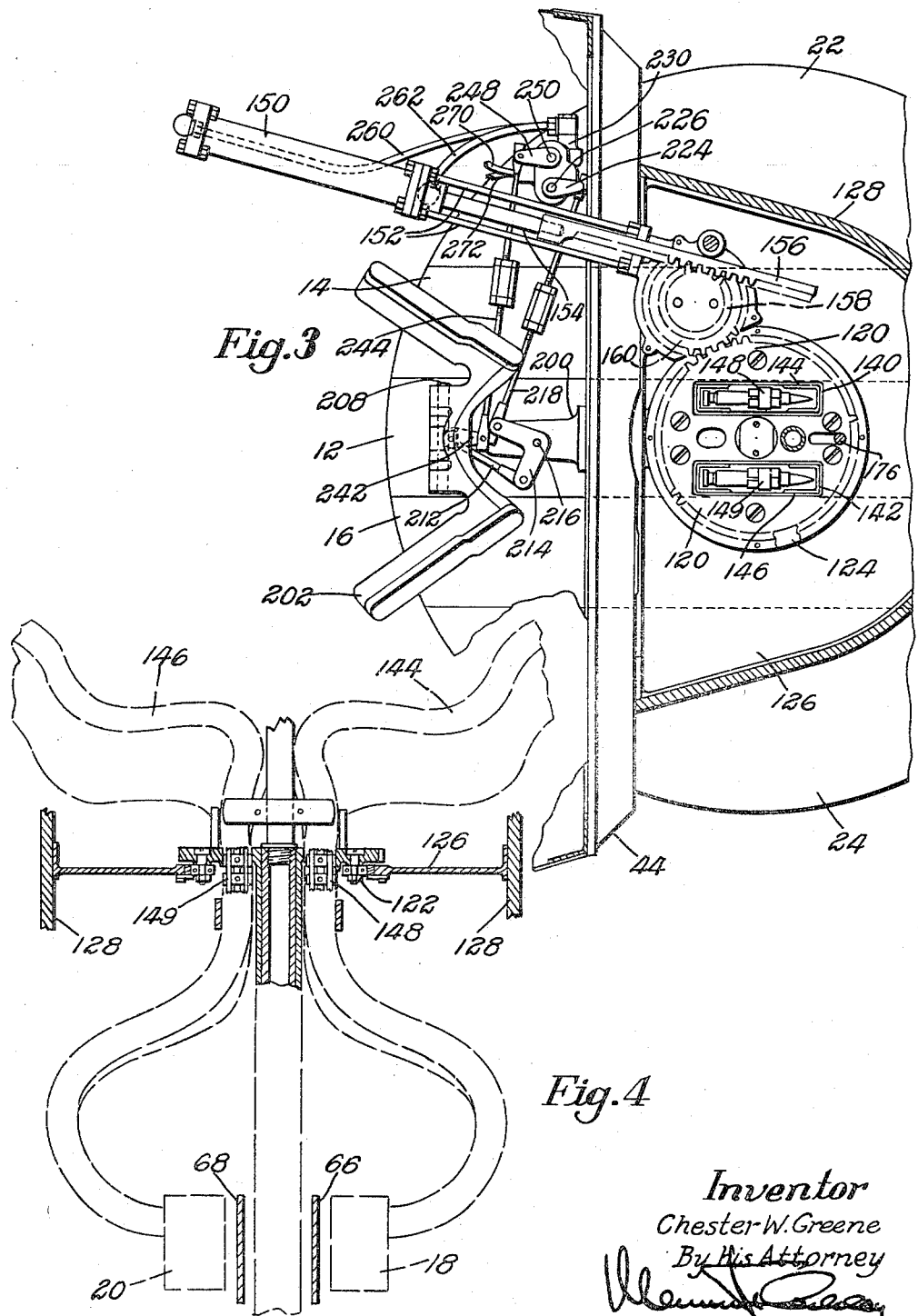
Fig. 3 is a slightly enlarged view taken along line III—III of Fig. 1.
Fig. 4 is a partial view taken along the line IV—IV of Fig. 1 showing the arrangement of the chutes.

The gear segment or ring-like portion 120 has rectangular openings 140 and 142 (Fig. 5) which serve as guides for flexible chutes 144 and 146 through which cartridge belts 148 and 149 may pass without restriction from a source of ammunition exterior to the turret. The construction is such that the flexible chutes 144 and 146 may be arranged with sufficiently large loops so that a turning of the turret in azimuth and movement of the guns in elevation will not result in excessive twisting of the chutes and consequent jamming of the cartridge belts. Several types of suitable flexible chutes are on the market and an example of one form of chute is disclosed in United States Letters Patent No. 2,310,884, dated February 9, 1943 in the name of Henry Trevaskis. Figure 4 gives a clear view of the arrangement of the loops permitting free action or movement of the guns.

Attached to bracket 126 above the sphere 10 is a fluid pressure cylinder 150 supported from the bracket 126 by rods 152 (Fig. 3). The piston in cylinder 150 is attached to a piston rod 154 which in turn is affixed to a rack 156 the teeth of which engage a small gear 158 pivoted on the bracket 126 to rotate with a larger gear 160 in mesh with the teeth of gear segment 120.

A vertical tube 170 (Fig. 1) is fastened to the sleeve 56 to rotate therewith about the post 46 and a yoke 172 is mounted on the tube 170 and pivotally supports the sight 132. A T-shaped element 174 (Figs. 1 and 2) is rotatably mounted between the adaptors 66 and 68, as shown, and has attached thereto a long link 176 upon which is mounted a yoke 178 pivotally attached at 180 to the sight 132 at a point in front of the yoke 172. The function of the rod 176 is to maintain the line of sight in a definite relationship with the line of fire in so far as elevation is concerned. It is to be noted that the rod 176 clears the sides of a slot 182 formed in the gear segment 120.

Figure 7:
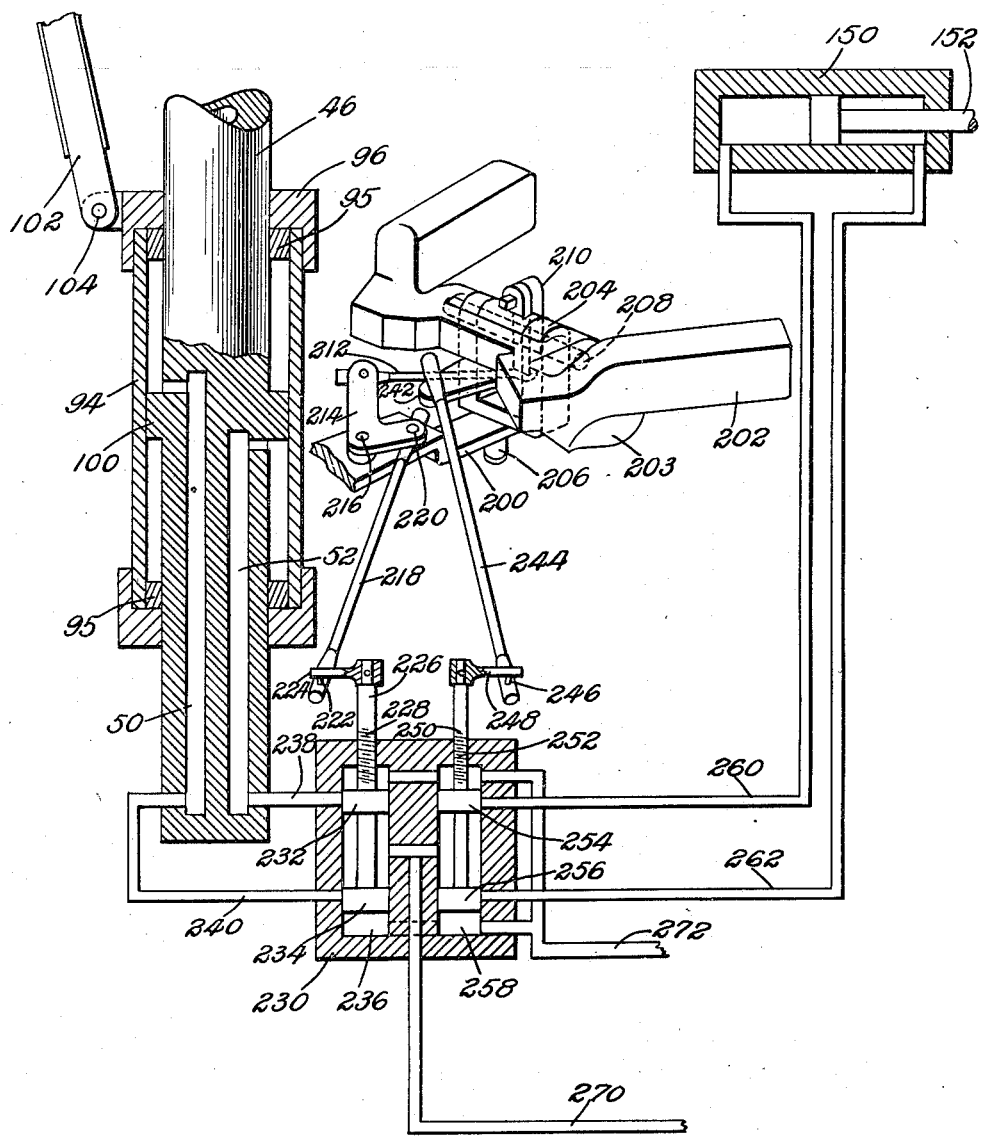
Fig. 7 is a diagrammatic representation of the relationship between the control handles, pilot valves and fluid pressure cylinders for moving the gun or guns in elevation and/or azimuth.

A bracket 200 (Fig. 3) is attached to the back side of circular frame member 44 and upon this bracket is mounted the operator's control handles 202 (Figs. 1, 3 and 7) having triggers 203 thereon for firing of the guns. At the end of bracket 200 a U-shaped member 204 is mounted for rotation on a vertical axis 206 and the handles 202 are adapted to rotate on a horizontal pin 208 passing through the U-shaped member 204. An arm 210 is clamped to the rod 208 to rotate therewith when the handles 202 are rotated in a vertical plane. A link 212 is pivotally attached to the bottom of arm 210 and is also pivotally attached at its other end to a bell crank 214 pivotally supported at 216 on the bracket 200. A link 218 is pivotally attached at 220 to the bell crank 214 and is also pivotally attached at 222 to an arm 224 which arm is pinned to a valve spindle 226. The valve spindle is threaded at 228 (Fig. 7) for engagement with the body of a dual valve 230. Stem 226 is provided with two lands 232 and 234 slidably mounted within a cylinder 236. Conduits 238 and 240 are provided, as shown in Fig. 7, and communicate with the two pressure fluid passages 50 and 52 of the post 46. Arm 210 (Fig. 7) has a forwardly extending plate 242 having pivotally attached thereto a link 244 which in turn is pivotally attached at 246 to an arm 248, which arm is pinned for rotation with a valve spindle 250 threaded at 252 for engagement with the body of the dual valve 230. The valve spindle 250 is also provided with two lands 254 and 256 slidably mounted within the cylinder 258. Conduits 260 and 262 lead from the cylinder 258, as shown in Figs. 3 and 7, to the opposite ends of the azimuth fluid pressure operated cylinder 150. A conduit 270 leading from some convenient source of power supply is connected to both cylinders 236 and 258, as shown, and an exhaust conduit 272 is connected, as shown, to the ends of the valve cylinders.

Figure 6:
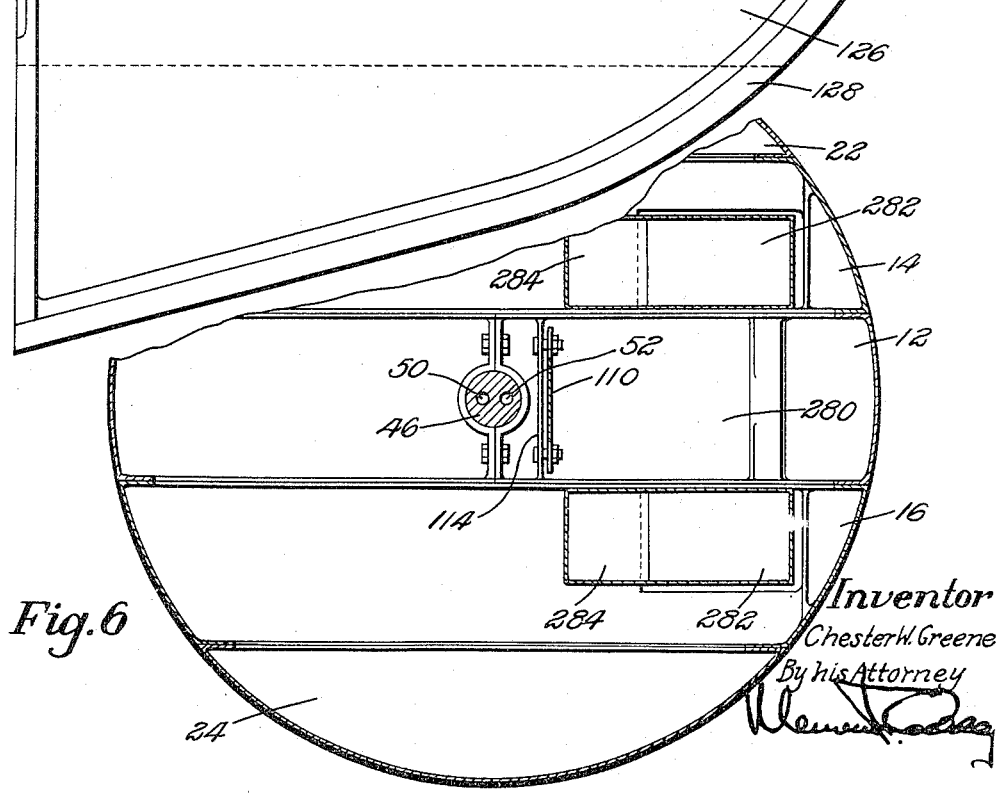
Fig. 6 is a slightly enlarged view along the lines VI—VI of Fig. 1.

The under side of section 12 of the turret casing is provided with an opening 280 (Fig. 6) through which the disintegrated parts of the cartridge belts may be discarded as well as any cartridge cases which may find their way into section 12. The plate 110 not only serves as a stiffening member but also serves to guide discarded elements through the opening 280. Sections 14 and 16 of the turret casing have openings 282 through which ejection chutes 284 guide discarded cartridge cases. Loose objects obviously can not be permitted to roll around within the turret casing.

Figure 2:
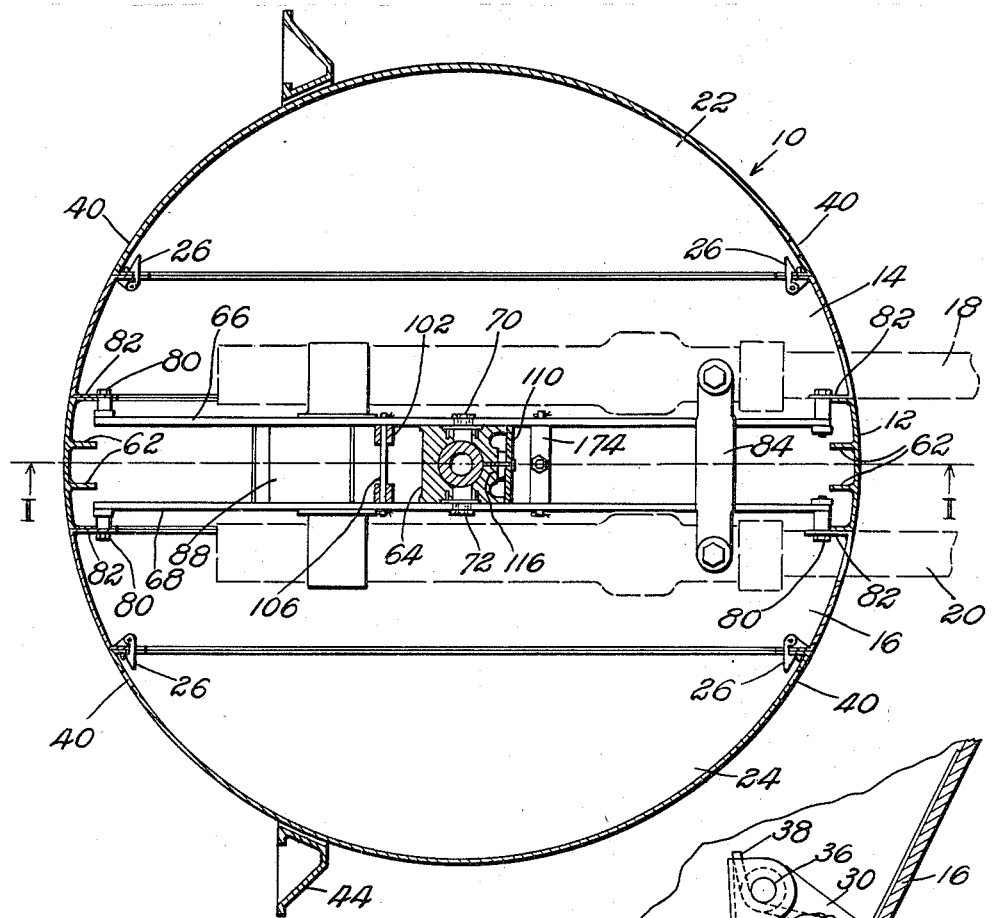
Fig. 2 is a horizontal section on the line II—II of Fig. 1, the guns being shown in dotted lines to illustrate their positions.

The operation can perhaps be clearly understood in the reading of the above description of the construction, but, assuming that the gunner desires to point the guns upwardly and to the right of the positions shown in Figs. 1 and 2, the handles 202 are moved downwardly and to the gunner's left. The downward movement of the handles 202 causes them to pivot about rod 208 and, by means of elements 212, 214, 218 and 224, to rotate the valve spindle 226 moving it lengthwise (upwardly as shown in Fig. 7) by virtue of the threads 228. As this occurs, land 232 permits pressure fluid from conduit 270 to enter conduit 238 and, ultimately, the lower compartment of the cylinder 94. At the same time, land 234 permits pressure fluid to escape from the upper compartment of cylinder 94 through passage 50 and conduits 240 and 272. The cylinder 94 is therefore caused to lower on the post 46 and link 102 elevates the gun muzzles or moves the guns in planes parallel to the post 46. The range of travel of the cylinder 94 is limited by spacing collars 95 placed in opposite ends of the cylinder to abut the annular shoulder 100. The movement of handles 202 to the gunner's left causes endwise movement of the spindle 250 (downwardly as shown in Fig. 7) because of threads 252. Land 256 opens line 262 to pressure fluid with the result that piston rod 152 will move further into cylinder 150 and the rotation of gears 158 and 160 as well as the gear segment 120 will cause the gun muzzles to move to the gunner's right. At the same time, valve land 254 will open conduit 260 to the exhaust line 272 permitting such movement. With the arrangement shown a considerable range of movement of the gun muzzles by power in both elevation and in azimuth may be had by the gunner in the use of his control handles 202. Any motion imparted to the control handles or grips 202 by the gunner is translated to the control valve 230 to determine the speed and direction of motion of the guns. A return of the handles 202 to neutral position holds the guns stationary in the particular position they are in. It is to be understood that the handles or grips 202 may be built to incorporate within them triggers 203 for operating the gun firing solenoids and one grip may contain a micro-switch, the depression of which may connect the interphone circuit of the airplane. Electrical connections for a camera (mounted with the sight) may be wired onto the firing switch circuit. The wiring for the gun firing solenoids, camera and interphone circuit is not shown in the drawings as it forms no part of the present invention.

It should be noted that the fluid pressure operated motor for moving the guns in elevation is very compactly arranged permitting ready access to other structural elements and eliminating interference with the rotation of the turret casing. If the turret is turned to either extreme position in azimuth, either turret casing section 22 or 24 can be easily removed for repair or replacement of parts. The sight is linked directly to the gun and therefore no play is present to cause inaccuracy in firing. As can easily be seen from the construction illustrated, not merely a set of two guns may be used, but it is quite possible to use one gun only or more than two guns, the gear segment 120 being modified to guide the requisite number of chutes for cartridge belts. It is also apparent that the mechanism for changing the positions of the guns in azimuth need not be fluid pressure operated but may be electrical.

Having described my invention, what I claim as new and desire to secure by Letters Patent of the United States is:

1. A machine gun mount having an elongated rigid member supporting an adaptor means with two guns thereon pivoted for motion about the longitudinal axis of said rigid member and about an axis perpendicular to said longitudinal axis, a fluid pressure operated motor member closely fitting and rotatable on the rigid member and slidable thereon, power translating means connecting the motor member to the adaptor means and guns whereby sliding motion of the motor member will move the guns about said perpendicular axis, power means for moving the guns about said rigid member, a spherical shell encircling said rigid member, the adaptor means and portions of said guns, said shell having a central section supported on said rigid member and two main side sections supported on said adaptor means for movement therewith, an aperture in the shell at one end of the rigid member, guiding means within said aperture for cartridge belt chutes, flexible cartridge belt chutes passing through said guiding means from a source exterior to said spherical shell and leading to said guns and arranged for freedom of movement of said guns, and means exterior to said shell to control said motor member and said power means.

2. A machine gun mount as described in claim 1, in which a sight is supported on said rigid member exterior to said shell and which is connected through said aperture with said guns for motion therewith.

3. A gun mount having an elongated and vertical rigid member supporting a gun for pivotal motion thereon about a vertical axis and a horizontal axis, means for effecting said pivotal motion, a spherical shell encircling said rigid member and a portion of said gun and including a main section rotatable with said gun in elevation, means adjacent the rigid member guiding a cartridge belt chute through the top of said spherical shell, said chute being flexible and arranged in a loop and leading to the gun, and means exterior to said spherical shell to control the means for effecting said pivotal motion.

4. A gun mount having an elongated rigid member supporting a gun for pivotal motion thereon about a vertical axis and a horizontal axis, said member having an annular shoulder, a motor cylinder enclosing said shoulder and slidable on said rigid member, fluid pressure connections to said cylinder at points above and below said shoulder, and power translating means connecting the gun and the said motor cylinder.

5. A gun mount having an elongated rigid member supporting a gun for pivotal motion thereon about a vertical axis and a horizontal axis, said member having an annular shoulder intermediate its length, a motor cylinder enclosing said shoulder and slidable on said rigid member, fluid pressure connections to said cylinder leading through said rigid member, power translating means connecting the gun and the said motor cylinder, a spherical shell encircling said elongated rigid member and part of the gun, means for rotating said gun and shell about the elongated rigid member, and means exterior to said spherical shell for controlling operation of the motor cylinder.

6. A gun mount having an elongated rigid member supporting at least two guns for pivotal motion thereon about the longitudinal axis of said member and about an axis perpendicular to the longitudinal axis, power means for effecting said rotation, a spherical shell encircling portions of said guns with means exterior to said shell for controlling said power means, said spherical shell including a ring section mounted on said rigid member in the plane thereof and sections rotatable with said guns in elevation, said ring section having means for guiding ammunition into said spherical shell.

7. A gun mount having an elongated rigid member supporting a gun for pivotal motion thereon about the longitudinal axis of said member and about an axis perpendicular to the longitudinal axis, power means for effecting said pivotal motion about said axes, a spherical shell encircling said elongated member and a portion of the gun, said shell including a main section rotatable with said gun about said longitudinal axis and a ring-like portion having an aperture in line with the rigid member, said aperture being provided with guiding means for a cartridge belt chute leading to said gun, and means exterior to said spherical shell for controlling the power means.

8. A gun mount having an elongated rigid member supporting a gun for pivotal motion thereon about the longitudinal axis of said member and about an axis perpendicular to said longitudinal axis, means for effecting said pivotal motion, a spherical shell encircling a portion of said gun, said shell including a main section rotatable with said gun about said longitudinal axis and a ring-like section having an aperture in line with said rigid member and having guiding means for a cartridge belt chute, a cartridge belt chute supported by said guiding means and leading from a source exterior to said shell and leading to said gun, and means exterior to said spherical shell to control the means for effecting said pivotal motion.

CHESTER W. GREENE.

REFERENCES CITED

The following references are of record in the file of this patent:

UNITED STATES PATENTS

| Number | Name | Date |
|---|---|---|
| 2,199,971 | Sanders | May 7, 1940 |
| 2,336,557 | McCallister | Dec. 14, 1943 |
| 2,364,951 | Corte | Dec. 12, 1944 |
| 2,366,410 | Klemperer et al. | Jan. 2, 1945 |
| 2,379,185 | Reek | June 26, 1945 |
| 2,412,109 | Trotter | Dec. 3, 1946 |
| 2,450,058 | Richardson | Sept. 28, 1948 |

FOREIGN PATENTS

| Number | Country | Date |
|---|---|---|
| 514,551 | Great Britain | Aug. 25, 1939 |
| 515,993 | Great Britain | June 29, 1937 |
| 545,459 | Great Britain | Apr. 18, 1942 |
| 560,269 | Great Britain | Mar. 28, 1944 |
| 798,816 | France | Mar. 11, 1936 |

OTHER REFERENCES

"Aviation" Mag. pp. 227–231, Designing Gun Turrets, Aircraft, June 1943.